US007318411B1

(12) United States Patent
Zhu et al.

(10) Patent No.: US 7,318,411 B1
(45) Date of Patent: Jan. 15, 2008

(54) ADAPTIVE IGNITION DWELL BASED ON IONIZATION FEEDBACK

(75) Inventors: Guoming G. Zhu, Novi, MI (US); Ross D. Pursifull, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/627,756

(22) Filed: Jan. 26, 2007

(51) Int. Cl.
*F02P 5/00* (2006.01)
*B60T 7/12* (2006.01)

(52) U.S. Cl. ........................... 123/406.26; 123/406.14; 701/111

(58) Field of Classification Search ........... 123/406.19, 123/406.26–406.29, 406.37, 406.12, 406.14, 123/406.21, 406.22, 480; 701/111, 114
See application file for complete search history.

(56) References Cited

U.S. PATENT DOCUMENTS 6,945,229 B1 9/2005 Zhu et al.
6,955,157 B1 10/2005 Haskara et al.
6,980,903 B2 * 12/2005 Daniels et al. .............. 701/108
7,013,871 B2 * 3/2006 Zhu et al. .............. 123/406.21
7,021,287 B2 * 4/2006 Zhu et al. ................... 123/435
7,086,382 B2 * 8/2006 Daniels et al. ......... 123/406.23
7,137,382 B2 * 11/2006 Zhu et al. ................... 123/435
7,213,573 B2 * 5/2007 Daniels et al. ......... 123/406.28
2005/0126537 A1 6/2005 Daniels et al.
2006/0042355 A1 3/2006 Zhu et al.

OTHER PUBLICATIONS

Ibrahim Haskara, Guoming G. Zhu and Jim Winkelman, Visteon Corporation, IC Engine Retard Ignition Timing Limit Detection and Control using In-Cylinder Ionization Signal, Copyright 2004 SAE International, 2004-01-2977.

Chao F. Daniels, Guoming G. Zhu and James Winkelman, Visteon Corporation, Inaudible Knock and Partial-Burn Detection Using In-Cylinder Ionization Signal, Oct. 27-30, 2003 SAE International, 2003-01-3149.

Guoming G. Zhu, Ibrahim Haskara and Jim Winkelman, Visteon Corporation, Stochastic Limit Control and Its Application to Knock Limit Control Using Ionization Feedback, Apr. 11-14, 2005 SAE International, 2005-01-0018.

* cited by examiner

*Primary Examiner*—John T. Kwon
(74) *Attorney, Agent, or Firm*—Brinks Hofer Gilson & Lione

(57) ABSTRACT

A system for determining a minimum ignition coil charge duration of an internal combustion engine to meet a desired level of combustion stability includes a sensor in communication with a controller. The sensor is configured to measure the ionization current of a cylinder of the internal combustion engine and output to the dwell controller. The controller is configured to determine a combustion stability criterion based upon the ionization signal and determine the minimum ignition coil charge duration based upon the combustion stability criterion.

20 Claims, 3 Drawing Sheets

ADAPTIVE IGNITION DWELL BASED ON IONIZATION FEEDBACK

BACKGROUND

1. Field of the Invention

The present invention generally relates to systems and methods for controlling the ignition coil charge time (dwell duration) of an internal combustion engine.

2. Description of the Known Technology

Internal combustion (IC) engines, such as those commonly found in automobiles, are designed to maximize power while meeting exhaust emission requirements with minimal fuel consumption. The combustion process of an IC engine can be controlled in a closed loop using in-cylinder ionization feedback. In this case, engine control computer routinely monitors the ionization current from each individual cylinder of the engine in order to determine combustion information. Depending on the ionization current, the engine control computer may make adjustments to maximize power, minimize fuel consumption and avoid undesirable engine operational conditions, such as engine knock and misfire.

In a conventional spark ignited internal combustion engine, the combustion is initiated by an ignition coil, which causes the electrical discharge (spark) of a spark plug. The duration of this ignition coil charge time is known as a dwell. Increasing the dwell increases the engine combustion stability due to increased spark energy and voltage. However, increasing the dwell duration increases electrical spark energy, leading to long spark duration. This long spark duration inhibits ionization current measurement, thereby preventing the engine control computer from receiving a proper ionization current signal. Illustrative of this problem is the spark occurring at high engine speeds, such as 6000 rpm. At such engine speeds, Spark duration of one millisecond can cover approximately 36 degrees of crank rotation. Accordingly, the ionization current cannot be detected during that period, resulting in a situation where no combustion information is provided to the engine control computer. Without this combustion information, the engine closed loop control computer cannot make the necessary adjustments to avoid engine knock and misfire. Therefore, there is a need for a system and method that controls the dwell duration to allow measurement of the ionization current at high engine speeds while maintaining engine combustion stability.

SUMMARY

In satisfying the above need, as well as overcoming the enumerated drawbacks and other limitations of the known technology, the present invention provides a system and method for determining and controlling a minimal ignition coil charge duration for an internal combustion engine to meet required combustion stability. The system includes a sensor for each cylinder of an internal combustion engine in communication with a controller. Each sensor is configured to measure the ionization current of a cylinder of an internal combustion engine and output an ionization signal to the controller. The controller determines a combustion stability criterion based upon the engine operational conditions and then determines the minimum ignition coil charge duration required to maintain a desired level of combustion stability based upon the previously determined combustion stability and actual combustion stability criteria calculated based upon the measured ionization signal.

Further objects, features and advantages of this invention will become readily apparent to persons skilled in the art after a review of the following description, with reference to the drawings and claims that are appended to and form a part of this specification.

DETAILED DESCRIPTION

Figure 1:
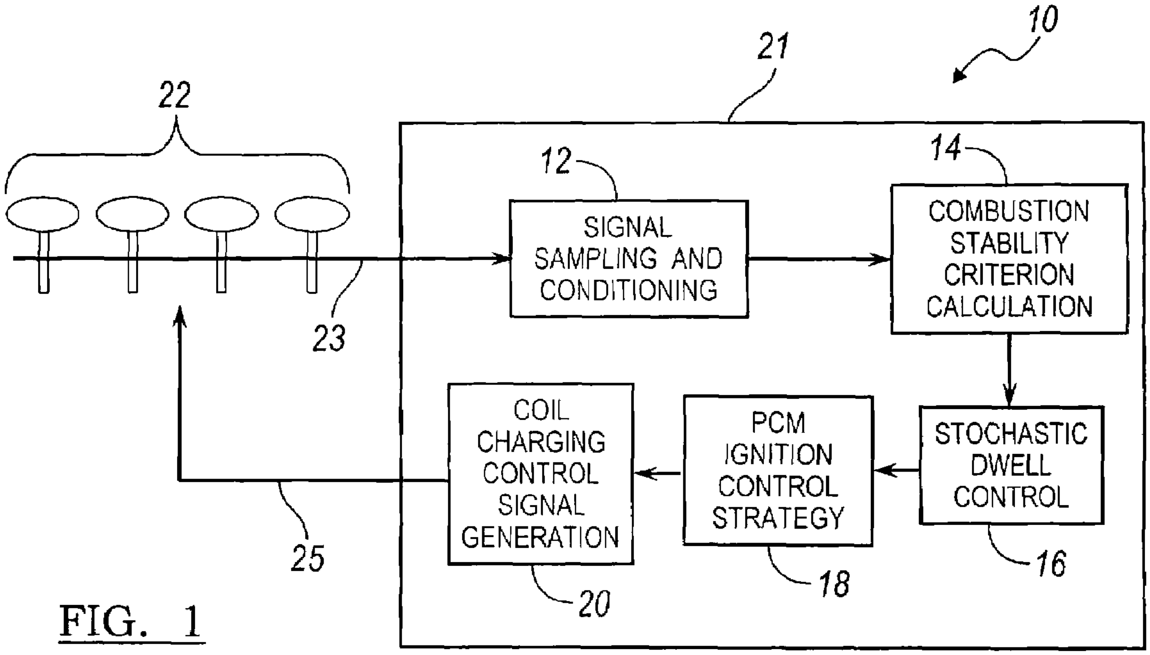
FIG. 1 illustrates a block diagram of a system embodying the principles of the present invention for determining an ignition coil charge duration for an internal combustion engine.

Referring to FIG. 1, a system 10 for determining a minimum ignition coil charge duration of an internal combustion engine, while maintaining a desired level of stable combustion, is shown. As its primary components, the system 10 includes a signal sampling and conditioning module 12, a combustion stability criterion (integral location) calculation module 14, a stochastic dwell control module 16, an ignition control strategy module 18, and an coil charging control signal generation module 20, all associated with a powertrain control module ("PCM") 21, and a set of ionization detection ignition coils 22 associated with respective cylinders of an internal combustion engine.

Each ionization detection ignition coil 22 provides a single ionization output signal 23 that is fed into the signal sampling and conditioning module 12, where the ionization signal is sampled crank angle wise (for example, every crank degree). The conditioned ionization output signal 23 is then relayed to the combustion stability criterion calculation module 14. As will be described later in more detail, the combustion stability criterion calculation module 14 calculates the combustion stability criterion.

The combustion stability criterion calculation module 14 further sends the actual combustion stability measurer (integral location) to the stochastic dwell control module 16, which determines minimum ignition coil charge duration based upon the desired combustion stability level and the actual combustion stability criterion (integral location). The minimum ignition coil charge duration may be determined using a lookup table. The lookup table includes a plurality of minimum ignition coil charge durations, each of the minimum ignition coil charge durations having a corresponding and combustion stability criterion. The minimal ignition coil charge duration can also be controlled using a stochastic controller in a closed loop. The stochastic dwell control module 16 outputs the minimum ignition coil charge duration corresponding to the related combustion stability criterion. The minimum ignition coil charge duration is passed to the ignition control strategy module 18, which instructs the coil charging control signal generation module 20 to provide a dwell control input command signal 25 to the cylinders.

The use of a high quality in-cylinder ionization signal enables the controlling of the duration of the ignition coil charge via information derived from ionization signals associated with the combustion process in each cylinder. This is possible because of the increased signal to noise ratio of the in-cylinder ionization signal due to the recent advance of electronics technology. The cycle-to-cycle variation in the combustion process results in the integral location calculated from an ionization signal that is similar to a random process. The system 10 implements a stochastic approach for closed loop control of ignition coil change duration utilizing the mean of the integral location signal derived from an ionization current signal as well as the evolution of its stochastic distribution. In particular, the stochastic dwell control module 16 is able to seek and find a minimum engine ignition coil charge duration that, when implemented, will not create any undesirable effects such as engine misfire and partial burn.

Figure 2:
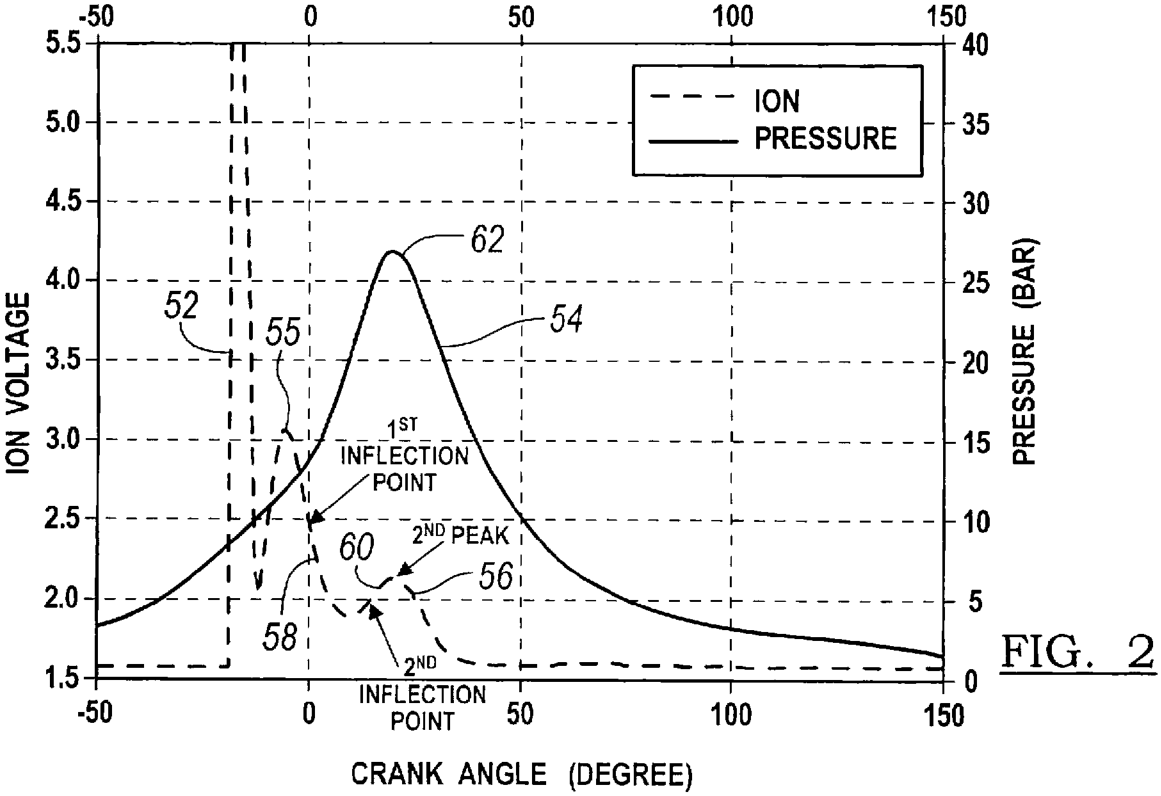
FIG. 2 illustrates a typical ionization signal of an internal combustion engine.

Referring now to FIG. 2, the chart 50 illustrates a typical ionization signal versus crank angle trace or plot 52, where 00 (degree) is the top dead center (TDC), with a corresponding in-cylinder pressure signal trace 54. Comparing to a cylinder pressure signal, an ionization signal 52 typically shows more detailed information about the combustion process through a corresponding waveform. This waveform shape of the ionization signal can change with varying loads, speeds, spark timings, air to fuel (A/F) ratios, exhaust gas re-circulation (EGR) rates, etc.

The ionization signal 52 is a measure of the local combustion mixture conductivity in the engine cylinder during the combustion process. This signal 52 is influenced not only by the complex chemical reactions that occur during combustion, but also by the local temperature and turbulence flow during the process. The ionization signal 52 is typically less stable than the cylinder pressure signal that is a measure of the global pressure changes in the cylinder.

The ionization signal 52 may show when a flame kernel is formed and propagates away from the spark gap, when the combustion is accelerating rapidly and reaches its peak burning rate, and when the combustion ends. A typical ionization signal usually consists of two peaks. The first peak 55 of the ionization signal 52 represents the flame kernel growth and development, and the second peak 56 represents a re-ionization due to an in-cylinder temperature increase resulting from both pressure increase and flame development in the cylinder.

Using the ionization post flame peak location, that is supposed to be lined up with the peak pressure location, to determine a reliable maximum brake torque (MBT) timing criterion is not always due to the disappearance of this peak at low loads, retarded spark timing, lean A/F ratios, or higher EGR rates. One can minimizes this above cited problems by establishing a robust multi-criteria MBT timing estimation method utilizing different ionization signal waveforms that may be generated under different engine operating conditions.

It has been recognized that the MBT timing occurs when the peak pressure location is around 15° After Top Dead Center (ATDC). By advancing or delaying the spark timing until the second peak of the ionization signal peaks around 15° ATDC, it is assumed that the MBT timing is found. Also, the combustion process of an internal combustion engine is usually described using the mass fraction burn versus crank angle. Through mass fraction burn, one can find when the combustion reaches peak burning velocity and acceleration and percentage burn location as function of crank angle. Maintaining these critical events at a specific crank angle produces a desirably efficient combustion process. In other words, the MBT timing can be found through these critical events. Still referring to FIG. 2, an inflection point 58 located right after the first peak (called the first inflection point) can be correlated to a maximum acceleration point of the net pressure. This maximum acceleration point is usually between 10% to 15% mass fraction burned. Another inflection point 60, located to the right and before the second peak of the ionization signal (called the second inflection point) 56 may correlate well with a maximum heat release rate point and is located around 50% mass fraction burned location. In addition, the second peak location 56 is related to a peak pressure location 62 of the pressure signal graph 54.

At MBT timing, it is known that a Maximum Acceleration point of Mass Fraction Burned (MAMFB) is located at Top Dead Center (TDC), that the 50 percent Mass Fraction Burned location (50% MFB) is around 8 to 10° ATDC, and that the peak cylinder pressure location (PCPL) is around 15° ATDC. Using the MBT timing criteria relationship between in-cylinder pressure and in-cylinder ionization signal, these three MBT timing criteria, namely, MAMFB, 50% MFB, and PCPL, can be obtained using an in-cylinder ionization signal. Thus, combining all three individual MBT timing criterion or criteria into one produces increased reliability and robustness of the MBT timing prediction.

As stated above, the second peak 56 of the ionization signal 52 is typically due to the in-cylinder temperature rise during the combustion process. In the case that in-cylinder temperature does not reach a re-ionization temperature threshold of the burned gas mixture, the second peak 56 of the ionization signal 52 may disappear. For example, when the engine is operated either at the idle condition, with very high EGR or with lean A/F mixture or combination of the above, the flame temperature is relatively low and the temperature could be below the re-ionization temperature threshold. Therefore, the second peak 56 may not be found or shown in the ionization signal 52. As such, the second peak 56 of the ionization signal 52 does not always appear in the ionization signal waveform at all engine operating conditions. At light loads, lean mixtures, or high EGR rates, the second peak 56 can be difficult to identify. Under these circumstances, it is almost impossible to find the MBT timing using the 2nd peak location 56 of the ionization signal 52. Therefore, the present invention uses multiple MBT timing criteria to increase the reliability and robustness of MBT timing estimation based upon in-cylinder ionization signal 52 waveforms. The present method therefore optimizes ignition timing by inferring from the ionization signal where the combustion event is placed in the cycle that corresponds to the MBT timing.

Figure 3:
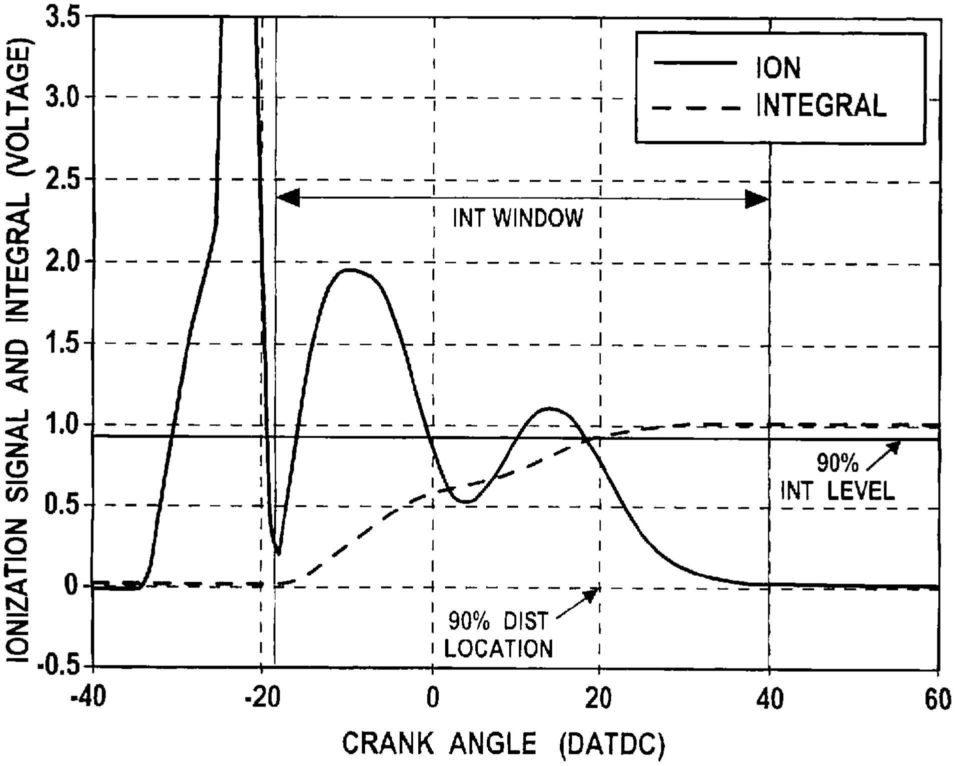
FIG. 3 illustrates a determination of integral location for a typical ionization signal of an internal combustion.
Figure 4:
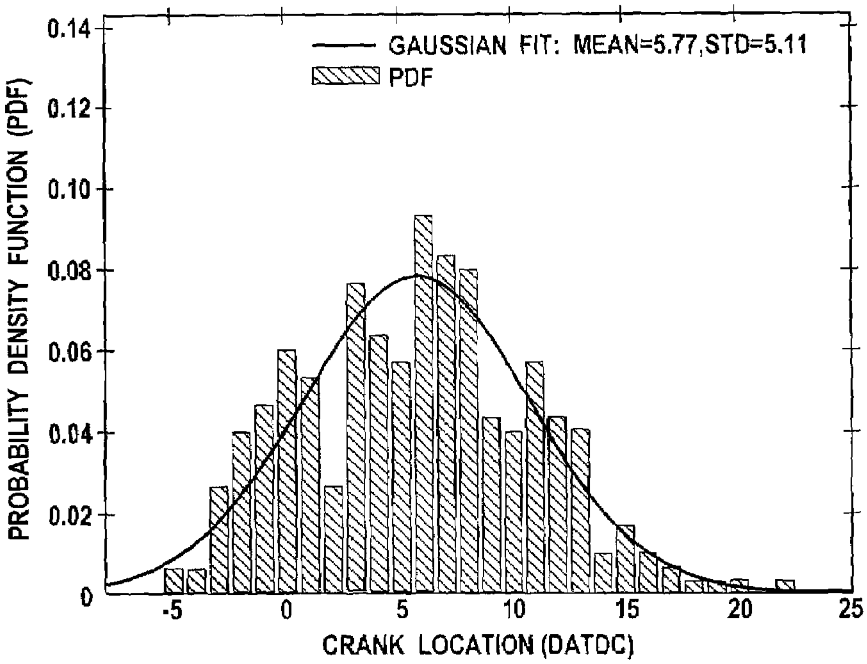
FIG. 4 illustrates a probability density function of the integral location versus crank location plot of an ionization signal of an internal combustion engine.
Figure 5:
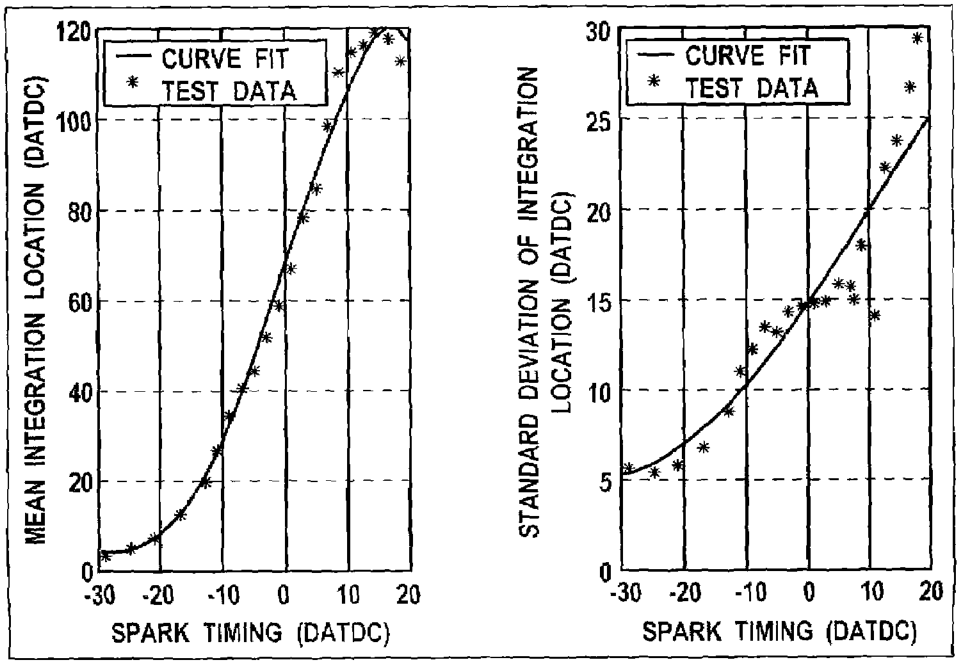
FIG. 5 illustrates a mean and standard deviation of ionization integral location signal relative to spark timing of an internal combustion engine.

Referring to FIGS. 3, 4 and 5, illustrated are charts used to determine the combustion stability criterion. First, an integral ratio function $R_{INT}(\bullet)$ is defined as follows:

$$R_{INT}(k) = \left(\sum_{i=CS}^{CS+k-1} Ion(i)\right) \Big/ \left(\sum_{i=CS}^{CS+n-1} Ion(i)\right) \times 100\%,\ k \le n$$

where Ion(i) is the ionization vector used for the MBT timing estimation, CS is the crank index at the start of integration window (see FIG. 3), and n is the crank degrees representing the integration window width. The Integration Location (IL) of a given percentage $R_{DES}$ is an integer $IL(R_{DES})$ that satisfies the following equation:

$$R_{INT}[IL(R_{DES})-1] < R_{DES} \leqq R_{INT}[IL(R_{DES})].$$

FIG. 3 shows a 90% integration location IL(90%). Note that, 100% integration location IL(100%) is ideally reached at the end of the integration window. FIG. 4 shows the stochastic properties of IL(90%) with spark timing at 21 degrees before TDC. 300 cycles (number of consecutive firing events at the same spark timing) of data are used to create the PDF (Probability Density Function) or histogram of the integration location, where the solid line is its Gaussian fit of PDF.

Based on the PDF shown in FIG. 4, the combustion cycle-to-cycle variations and statistics of the ionization integration locations seem to be close to a Gaussian random process. As the dwell duration gets reduced, PDF of integration location starts skewing towards the retard direction. But more importantly, at the spark timing with a desired combustion stability level, the PDFs are close to a Gaussian random process.

The mean and standard deviation of the ionization integration locations (90%) during a spark sweep at 1500 RPM with 2.62 bar BMEP are shown in FIG. 5, where stars represent the test data and the solid lines are fitted curves using polynomials. It can be observed that both mean and standard deviation of integration location increases as the spark timing retards. The standard deviation of integration location is used as the as the combustion stability criterion since it has the similar characteristics to the coefficient of variation of indicated mean effective pressure.

Figure 6:
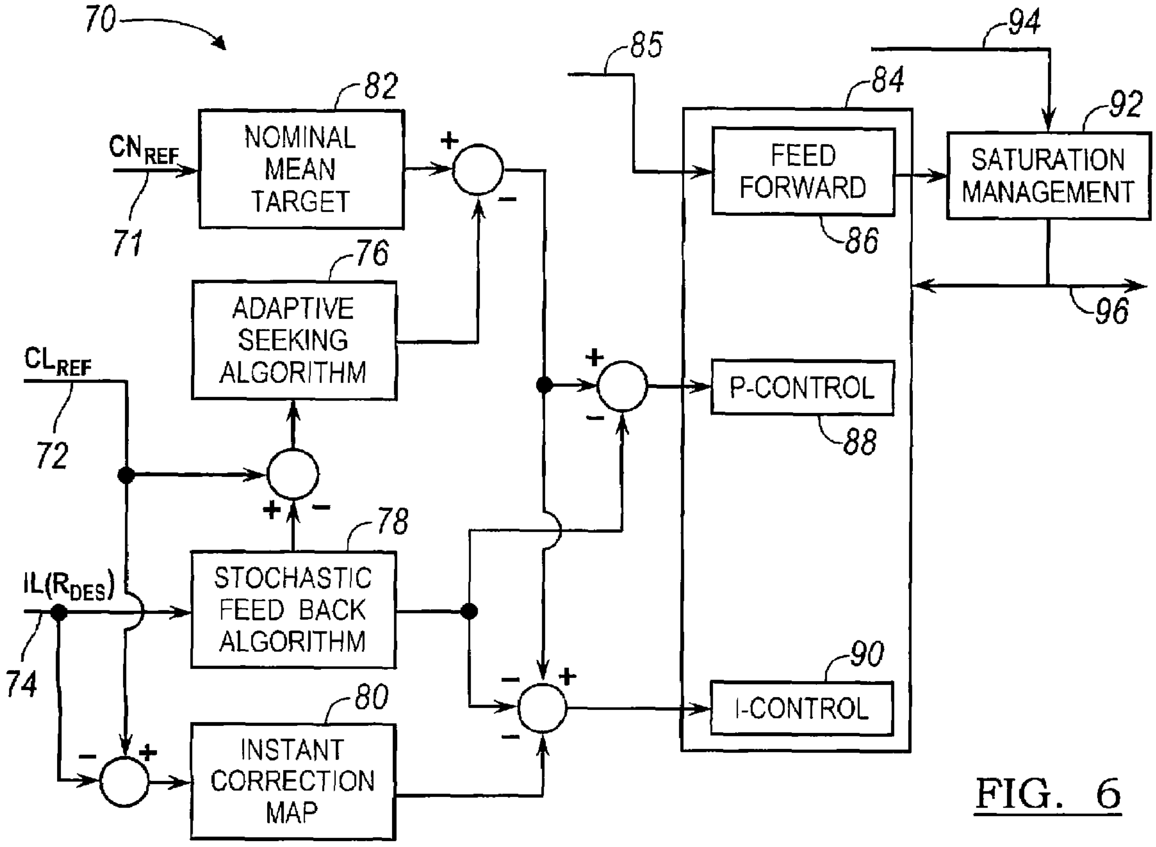
FIG. 6 illustrates a block diagram of an implementation of the system for determining an ignition coil charge duration for an internal combustion engine embodying the principles of the present invention.

Referring to FIG. 6, a more detailed view stochastic closed-loop border line limit controller 70 in which the stochastic dwell control module 16, ignition control strategy module 18, and coil charging control signal generation module 20 are implemented. Inputs to the stochastic closed-loop border line limit controller 70 are made up of two parts (reference confidence number $CN_{REF}$ 70 and confidence level $CL_{REF}$ 72), and the stochastic limit feedback signal $IL(R_{DES})$ 74. The control objective is to maintain a given percentage $CN_{REF}$ 70 of the controlled feedback signal $IL(R_{DES})$ 74 stay below the desired confidence level $CL_{REF}$ 72.

There are three main feedback actions of the control scheme. These three feedback action include an adaptive seeking feedback algorithm (loop) 76, a regulation controller for stochastic feedback algorithm (loop) 78, and an instant correction feedback algorithm (loop) 80.

The purpose of the adaptive seeking feedback algorithm 76 is two-fold. First, the adaptive seeking feedback algorithm 76 reduces the calibration conservativeness by providing the regulation engine with its "TRUE" ignition timing limit target. Second, the adaptive seeking feedback algorithm 76 improves the robustness of the stochastic dwell control module 16 when the engine operates under different conditions.

The nominal mean target block 82 consists of a multi-dimensional lookup table using reference confidence number $CN_{REF}$, engine speed and load as input, and the output is the estimated mean target MT from a calibration table. Mean target describes the desired value for the mean of the feedback signal. The stochastic feedback algorithm block 78 forms a buffer $B_{IL}$ of $IL(R_{DES})$ with a calibratable length m (number of consecutive combustion events). At each event, a new data is entered and the oldest one is removed from the buffer. The mean of $B_{IL}$ is calculated by the following equation:

$$MN_{IL} = \frac{1}{m}\sum_{i=0}^{m-1} B_{IL}(i)$$

and actual confidence number $CN_{ACT}$ can be calculated by $$CN_{ACT} = \left(\sum_{i=0}^{m-1} B_{IL}(i)\cdot I_B(i)\right) \Big/ \left(\sum_{i=0}^{m-1} B_{IL}(i)\right) \times 100\%$$

where $I_B(i)=1$ if $B_{IL}(i) \leqq CL_{REF}$, otherwise, $I_B(i)=0$.

The actual confidence level $CL_{ACT}$ of a given confidence number $CN_{REF}$ is another parameter of interest. Define $\overline{B}_{IL}$ as a reordered vector of $B_{IL}$ with its elements arranged in an increased order. Then the actual confidence level can be defined as follows:

$$CL_{ACT} = \overline{B}_{IL}(k)$$

where k is the closest integer of $m \cdot CL_{REF}$.

The adaptive seeking algorithm block 76 utilizes adaptation error ($CL_{REF}-CL_{ACT}$) as input, and the output is Mean Target Correction (MTC) obtained by integrating the adaptation error with a calibratable gain. This control loop is used to reduce the conservativeness of the mean target MT for the regulation controller discussed below.

An instant correction feedback map 80 calculates an instant correction signal to be fed into the integration portion of regulation controller 84. The instant correction is generated by a lookup table using the error signal $CL_{REF}-IL(R_{DES})$ as input. When the error is greater than zero, the output is zero, and when the error is less than zero, the output is positive and increases as the input reduces.

The regulation controller 84 is used to regulate the mean value of the stochastic limit feedback signal to a mean target value. The regulation controller 84 includes three primary components: a feedforward control 86, a proportional control 88 and an integration control 90. The error input to the regulation controller 84 is $$err_{PI} = MT - MTC - MN_{IL}$$

The input to the feedforward control 86 is the engine speed/load 85. The input to the proportional control 88 is the difference between the stochastic feedback algorithm block 72, the nominal mean target block 82 and the adaptive seeking algorithm block 76. The input to the integration control 106 includes both input from the instant correction map block 80 and the mean error between the stochastic feedback algorithm block 72, adaptive seeking algorithm 76 and the nominal mean target 82. Despite the variability of the stochastic retard limit feedback signal $IL(R_{DES})$, its mean value is a well-behaved signal for regulation purposes. The regulation controller 84 is tuned to provide the desired settling time and steady-state accuracy for the response.

A saturation management 92 provides an average ignition-timing signal. If the regulation controller 84 output 96 is more advanced than a desired ignition timing 94, the output 96 becomes the desire ignition timing 94; otherwise, the output 96 is the output from the regulation controller 84.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A system for determining a minimum ignition coil charge duration of an internal combustion engine, the system comprising:

a sensor being configured to measure the ionization current of at least one cylinder of the internal combustion engine, the sensor being further configured to output an ionization signal based upon the ionization current of the at least one cylinder of the internal combustion engine; and a stochastic controller in communication with the sensor, the controller being configured to determine a combustion stability criterion based upon the ionization signal and determine the minimum ignition coil charge duration based upon the combustion stability criterion.

2. The system of claim 1, wherein the stochastic controller includes an adaptive feedback loop for adjusting the minimum ignition coil charge duration in response to a change in the combustion stability criterion.

3. The system of claim 1, wherein the stochastic controller includes a regulation loop for adjusting the minimum ignition coil charge duration in response to a change in the combustion stability criterion.

4. The system of claim 1, wherein the stochastic controller includes an instant correction loop for calculating an instant correction signal based on an error signal.

5. The system of claim 1, wherein the controller includes a lookup table containing a plurality minimum ignition coil charge durations, each of the minimum ignition coil charge durations having a corresponding combustion stability criterion.

6. The system of claim 1, further comprising a signal conditioning module in communication with the sensor and the controller, the signal conditioning module being configured to condition the ionization signal.

7. The system of claim 1, further comprising an ignition control signal generator in communication with the controller, the ignition control signal generator being configured to receive the minimum ignition coil charge duration and adjust the duration of a spark applied by an ignition coil based on the minimum ignition coil charge duration.

8. The system of claim 1, wherein the controller is configured to the determine the combustion stability criterion by:

defining an integral ratio function;

determining an integration location of a given percentage based on the integral ratio function; and determining the combustion stability criterion, wherein the combustion stability criterion is the standard deviation of the integration location.

9. The system of claim 8, wherein the integration ratio function is defined as:

$$R_{INT}(k) = \left(\sum_{i=CS}^{CS+k-1} Ion(i)\right) \Big/ \left(\sum_{i=CS}^{CS+n-1} Ion(i)\right) \times 100\%,\ k \le n.$$

10. The system of claim 9, wherein the integration location is defined as:

$$R_{INT}(k) = \left(\sum_{i=CS}^{CS+k-1} Ion(i)\right) \Big/ \left(\sum_{i=CS}^{CS+n-1} Ion(i)\right) \times 100\%,\ k \le n.$$

11. The system of claim 1, wherein the controller is configured to the control a minimal dwell duration using the ionization signal while the ignition coil charge duration of the internal combustion engine is trolled using a composite maximum brake torque criterion derived from the ionization current.

12. A method for determining a minimum ignition coil charge duration of an internal combustion engine, the method comprising the steps of:

measuring an ionization current of at least one cylinder of the internal combustion engine to determine an ionization signal;

determining a combustion stability criterion based upon the ionization signal; and determining a minimum ignition coil charge duration based upon the combustion stability criterion.

13. The method of claim 12, further comprising the steps of:

measuring the ionization current of at least one cylinder of the internal combustion engine to determine the ionization signal;

determining if there has been a change in the combustion stability criterion;

determining the minimum ignition coil charge duration based upon the change in the combustion stability criterion.

14. The method of claim 12, further comprising the step of filtering the measured ionization current.

15. The method of claim 12, further comprising the step of transmitting the minimum ignition charge duration to an ignition control signal generator.

16. The method of claim 12, further comprising the step of adjusting the duration of a spark applied by an ignition coil based on the minimum ignition coil charge duration.

17. The method of claim 12, wherein the combustion stability criterion is determined by:

defining an integral ratio function;

determining an integration location of a given percentage based on the integral ratio function; and determining the combustion stability criterion, wherein the combustion stability criterion is the standard deviation of the integration location.

18. The method of claim 17, wherein the integration ratio function is defined as:

$$R_{INT}(k) = \left(\sum_{i=CS}^{CS+k-1} Ion(i)\right) \Big/ \left(\sum_{i=CS}^{CS+n-1} Ion(i)\right) \times 100\%,\ k \le n.$$

19. The method of claim 18, wherein the integration location is defined as:

$$R_{INT}(k) = \left(\sum_{i=CS}^{CS+k-1} Ion(i)\right) \Big/ \left(\sum_{i=CS}^{CS+n-1} Ion(i)\right) \times 100\%,\ k \le n.$$

20. The method of claim 12, further comprising the step of controlling a minimal dwell duration using the ionization signal while the ignition coil charge duration of the internal combustion engine is trolled using a composite maximum brake torque criterion derived from the ionization current.

* * * * *

UNITED STATES PATENT AND TRADEMARK OFFICE

CERTIFICATE OF CORRECTION

PATENT NO. : 7,318,411 B1
APPLICATION NO. : 11/627756
DATED : January 15, 2008

INVENTOR(S) : Guoming G. Zhu et al.

It is certified that error appears in the above-identified patent and that said Letters Patent is hereby corrected as shown below:

In the Claims

Column 7, in claim 5, line 2, after "containing a plurality" insert --of--.

Column 7, in claim 8, line 2, after "configured to" delete "the".

Column 7, in claim 11, line 2, after "configured to" delete "the".

Signed and Sealed this

Third Day of June, 2008

JON W. DUDAS
*Director of the United States Patent and Trademark Office*